UNITED STATES PATENT OFFICE.

WILLIAM G. LINDSAY, OF CALDWELL, NEW JERSEY, ASSIGNOR TO THE CELLULOID COMPANY, OF NEW YORK, N. Y., A CORPORATION OF NEW JERSEY.

PROCESS OF MAKING ACETYL-CELLULOSE PLASTIC COMPOUNDS.

1,226,342. Specification of Letters Patent. Patented May 15, 1917.

No Drawing. Original application filed May 23, 1912, Serial No. 699,236. Divided and this application filed July 10, 1915. Serial No. 39,191.

*To all whom it may concern:*

Be it known that I, WILLIAM G. LINDSAY, a citizen of the United States, residing at Caldwell, in the county of Essex and State of New Jersey, have invented certain new and useful Improvements in Processes of Making Acetyl-Cellulose Plastic Compounds, of which the following is a specification.

This is a division of my application Serial No. 699,236 filed May 23, 1912.

The various compositions to which the present invention relates are employed in the arts, sometimes as imitations of natural substances and sometimes as films which are used for photographic purposes.

Although the final or useful form of the different compounds of acetyl cellulose is that of a solid or dry material, the different processes of conversion into this final solid form involve, as is well understood, the employment of solutions or mixtures of varying consistency as to plasticity, stiffness or fluidity, dependent generally upon the proportion and kind of solvent used to the amount of the original base—acetyl cellulose.

In the treatment of acetyl cellulose for the production of plastic masses which can be utilized in a manner similar to the nitro-cellulose compounds, the best known of which has received the trade name of "celluloid", and the production of solutions for the manufacture of lacquers, varnishes, photographic films and flexible compounds, I have discovered that methyl acetate in admixture with methyl alcohol exerts a solvent action on that variety of cellulose which is freely soluble in acetone.

It is well known that methyl acetate has been proposed as a solvent for the acetone-soluble variety of acetyl cellulose, and that the methyl acetate found on the market contains varying amounts of methyl alcohol.

I have discovered, however, that when the commercial or the 100 per cent. methyl acetate is diluted with methyl alcohol in certain proportions there results a product of increased solvent action for the preparation of acetyl cellulose compounds.

The best proportions I have found are 30 per cent. to 40 per cent. of methyl alcohol and 60 per cent. to 70 per cent. of methyl acetate. This constitutes the liquid solvent mixture, although the proportions may be varied without departure from the spirit of my invention.

An example of carrying out my process which, in addition to the new solvents, constitutes the subject of my discovery, is as follows:

To 100 parts, by weight, of the acetone-soluble variety of acetyl cellulose I add from 10 to 20 parts of paraethyltoluolsulfonamid and incorporate these substances. I then add from 60 to 70 parts, by weight, of a mixture composed of 70 parts by volume of methyl acetate and 30 parts by volume of methyl alcohol. The mixture is then thoroughly incorporated by malaxating and when a uniform mixture is obtained the excess of solvent is allowed to evaporate and the dough-like mass thus obtained is further worked up according to the method which is well known in the manufacture of nitro-cellulose-camphor compounds.

Again, in order to make a compound which is plastic but which is not inflammable, I proceed as follows:

To 100 parts by weight of the acetone-soluble variety of acetyl cellulose I add 10 to 20 parts of paraethyltoluolsulfonamid and 20 to 30 parts of triphenylphosphate; to the mixture thus obtained I add from 60 to 70 parts by weight of a mixture composed of 70 parts by volume of methyl acetate and 30 parts by volume of methyl alcohol. The mixture is then incorporated by suitable malaxating or kneading, etc., and when a uniform consistency is obtained the excess of solvent is allowed to evaporate, and the dough-like mass thus produced is further worked up according to the method which is well known in the manufacture of nitro-cellulose-camphor compounds.

By paraethyltoluolsulfonamid, I mean the compound having the following structural formula—

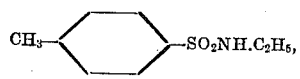

the same being an alkylated aromatic sulfonamid.

Having thus described my invention, what I claim is:

1. The process of producing plastic compounds from acetyl cellulose of the variety which is freely soluble in acetone which consists in mixing the said acetyl cellulose with paraethyltoluolsulfonamid and adding thereto methyl acetate and ethyl alcohol, substantially as described.

2. The process of producing plastic compounds from acetyl cellulose of the variety which is freely soluble in acetone which consists in mixing the said acetyl cellulose with paraethyltoluolsulfonamid and adding thereto methyl acetate and methyl alcohol, and subjecting the mass to heat and pressure, substantially as described.

3. The process of producing plastic compounds from acetyl cellulose of the variety which is freely soluble in acetone which consists in mixing the said acetyl cellulose with paraethyltoluolsulfonamid and triphenylphosphate; then adding to the mixture a solvent consisting of methyl acetate and methyl alcohol, substantially as described.

4. The process of producing plastic compounds from acetyl cellulose of the variety which is freely soluble in acetone which consists in mixing the said acetyl cellulose with paraethyltoluolsulfonamid and triphenylphosphate; then adding to the mixture a solvent consisting of methyl acetate and methyl alcohol, and subjecting the mass to heat and pressure, substantially as described.

5. The process of producing plastic compounds from acetyl cellulose of the variety which is freely soluble in acetone which consists in mixing the said acetyl cellulose with an alkylated aromatic sulfonamid and adding thereto methyl acetate and ethyl alcohol, substantially as described.

6. The process of producing plastic compounds from acetyl cellulose of the variety which is freely soluble in acetone which consists in mixing the said acetyl cellulose with an alkylated aromatic sulfonamid and adding thereto methyl acetate and methyl alcohol, and subjecting the mass to heat and pressure, substantially as described.

7. The process of producing plastic compounds from acetyl cellulose of the variety which is freely soluble in acetone which consists in mixing the said acetyl cellulose with an alkylated aromatic sulfonamid and triphenylphosphate; then adding to the mixture a solvent consisting of methyl acetate and methyl alcohol, substantially as described.

8. The process of producing plastic compounds from acetyl cellulose of the variety which is freely soluble in acetone which consists in mixing the said acetyl cellulose with an alkylated aromatic sulfonamid and triphenylphosphate; then adding to the mixture a solvent consisting of methyl acetate and methyl alcohol, and subjecting the mass to heat and pressure, substantially as described.

In testimony whereof I affix my signature.

WILLIAM G. LINDSAY.